US008098461B2

(12) United States Patent
Nojima et al.

(10) Patent No.: US 8,098,461 B2
(45) Date of Patent: Jan. 17, 2012

(54) MICRO ACTUATOR DEVICE, HEAD SUSPENSION ASSEMBLY AND STORAGE MEDIUM DRIVING DEVICE

(75) Inventors: Yusuke Nojima, Ome (JP); Shinji Koganezawa, Atsugi (JP)

(73) Assignee: Toshiba Storage Device Corporation, Tokyo (JP)

( * ) Notice: Subject to any disclaimer, the term of this patent is extended or adjusted under 35 U.S.C. 154(b) by 97 days.

(21) Appl. No.: 12/754,520

(22) Filed: Apr. 5, 2010

(65) Prior Publication Data
US 2010/0195251 A1   Aug. 5, 2010

Related U.S. Application Data

(63) Continuation of application No. PCT/JP2007/069629, filed on Oct. 5, 2007.

(51) Int. Cl.
*G11B 21/10* (2006.01)
(52) U.S. Cl. .................................................. 360/294.4
(58) Field of Classification Search ................. 360/294.4
See application file for complete search history.

(56) References Cited

U.S. PATENT DOCUMENTS

| | | | | |
|---|---|---|---|---|
| 7,301,731 | B2 * | 11/2007 | Mita et al. ................... | 360/294.4 |
| 7,352,538 | B2 * | 4/2008 | Kurihara et al. ............ | 360/294.4 |
| 7,369,347 | B2 * | 5/2008 | Lee .............................. | 360/75 |
| 7,420,785 | B2 * | 9/2008 | Yamazaki et al. .......... | 360/294.4 |
| 2001/0038515 | A1 | 11/2001 | Koganezawa et al. | |
| 2002/0012194 | A1 | 1/2002 | Inagaki et al. | |
| 2003/0173411 | A1 | 9/2003 | Fujii et al. | |
| 2004/0095687 | A1 | 5/2004 | Shiraishi et al. | |

FOREIGN PATENT DOCUMENTS

| | | |
|---|---|---|
| JP | 10-293979 | 11/1998 |
| JP | 2002-074870 | 3/2002 |
| JP | 2002-083476 | 3/2002 |
| JP | 2003-273419 | 9/2003 |
| JP | 2004-199823 | 7/2004 |

OTHER PUBLICATIONS

International Search Report mailed by Japan Patent Office on Jan. 22, 2008.
Decision of a Patent Grant in Japanese Application No. 2009-535946, mailed Sep. 6, 2011.

\* cited by examiner

*Primary Examiner* — Mark Blouin
(74) *Attorney, Agent, or Firm* — Knobbe Martens Olson & Bear, LLP

(57) ABSTRACT

According to one embodiment, a micro actuator device, includes: a first piezoelectric element superposed on a first lower support plate coupled to a fixed plate; a second piezoelectric element superposed on a second lower support plate in parallel with the first lower support plate coupled to the fixed plate; a first upper support plate interposing the first piezoelectric element between the first upper support plate and the first lower support plate, and generating strain equal to strain of the first lower support plate when a tensile force of the first piezoelectric element acts on the first lower support plate; and a second upper support plate interposing the second piezoelectric element between the second upper support plate and the second lower support plate, and generating strain equal to strain of the second lower support plate when a tensile force of the second piezoelectric element acts on the second lower support plate.

7 Claims, 5 Drawing Sheets

MICRO ACTUATOR DEVICE, HEAD SUSPENSION ASSEMBLY AND STORAGE MEDIUM DRIVING DEVICE

CROSS-REFERENCE TO RELATED APPLICATIONS

This application is a continuation of PCT international application Ser. No. PCT/JP2007/069629 filed on Oct. 5, 2007 which designates the United States, incorporated herein by reference.

BACKGROUND

1. Field

One embodiment of the invention relates to a storage medium driving device such as a hard disk driving device, and especially relates to a micro actuator device and a head suspension assembly incorporated in such storage medium driving device.

2. Description of the Related Art

As disclosed in, for example, Japanese Patent Application Publication (KOKAI) No. 2002-83476, Japanese Patent Application Publication (KOKAI) No. 2002-74870 and Japanese Patent Application Publication (KOKAI) No. 2004-199823, the micro actuator device using a pair of piezoelectric elements is widely known. In the micro actuator device, each piezoelectric element is interposed between an upper and lower pair of support plates. The upper support plate generates strain larger than strain of the lower support plate when a tensile force of the piezoelectric element acts on the lower support plate. A displacement of a head slider occurs based on not only an extension of the support plate resulting from the tensile force of the piezoelectric element but also a bending deformation of the support plate resulting from a difference between the strains.

In such micro actuator device, since the piezoelectric element is interposed between the upper and lower pair of support plates, a fragile piezoelectric element may be surely protected. On the other hand, the above-described bending deformation is linked to a torsional mode and a bending mode of the head suspension. In this manner, a natural frequency of the head suspension decreases. An enlargement of a control band is inhibited.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

Figure 1:
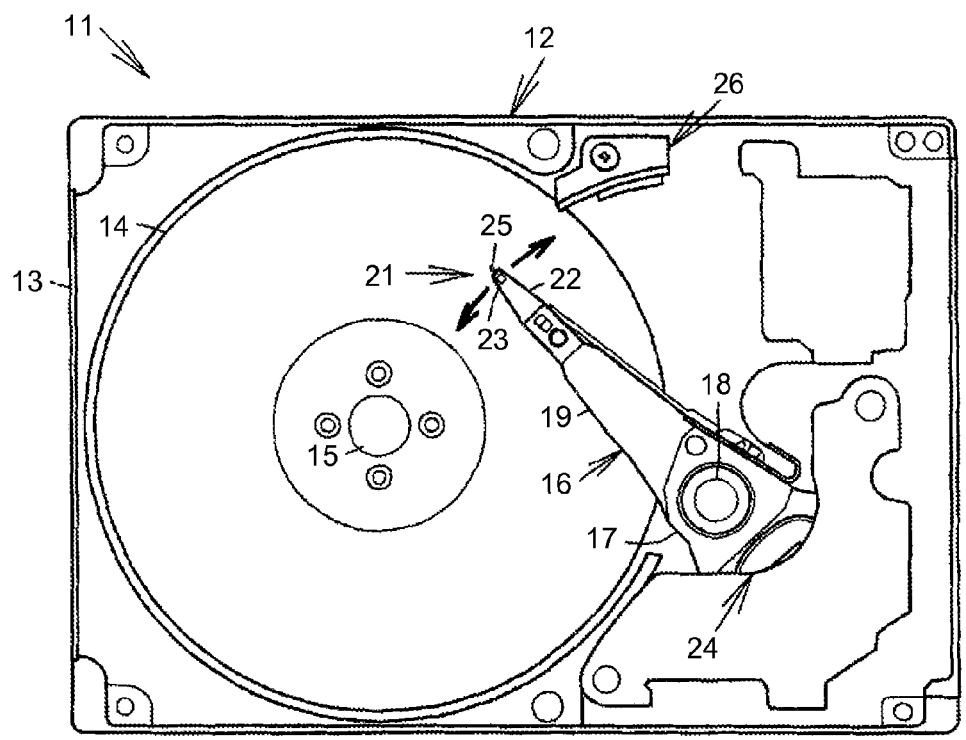
FIG. 1 is an exemplary schematic plan view of a hard disk driving device according to an embodiment of the invention.

Various embodiments according to the invention will be described hereinafter with reference to the accompanying drawings. In general, according to one embodiment of the invention, a micro actuator device, includes: a fixed plate fixed to a supporting member; a first lower support plate extended from a base end of the first lower support plate coupled to the fixed plate toward a top end of the first lower support plate; a second lower support plate extended in parallel with the first lower support plate from a base end of the second lower support plate coupled to the fixed plate toward a top end of the second lower support plate; a first piezoelectric element superposed on a surface of the first lower support plate and joined to the first lower support plate on a first junction area defined on the first lower support plate; a second piezoelectric element superposed on a surface of the second lower support plate and joined to the second lower support plate on a second junction area defined on the second lower support plate; a first upper support plate which is joined to a surface of the first piezoelectric element on a third junction area of the first upper support plate, and interposes the first piezoelectric element between the third junction area and the first junction area, and is configured to generate strain equal to strain of the first lower support plate when a tensile force of the first piezoelectric element acts on the first lower support plate; a second upper support plate which is joined to a surface of the second piezoelectric element on a fourth junction area of the second upper support plate, and interposes the second piezoelectric element between the fourth junction area and the second junction area, and is configured to generate strain equal to strain of the second lower support plate when a tensile force of the second piezoelectric element acts on the second lower support plate; a first junction plate joined to a surface of the first upper support plate on the top end of the first lower support plate; a second junction plate joined to a surface of the second upper support plate on the top end of the second lower support plate; a first coupling piece extended from a base end of the first coupling piece coupled to the first junction plate toward a top end of the first coupling piece; a second coupling piece extended in parallel with the first coupling piece from a base end of the second coupling piece coupled to the second junction plate toward a top end of the second coupling piece; and a support plate coupled to the top ends of the first and second coupling pieces.

According to another embodiment of the invention, ahead suspension assembly, includes: a flexure having a gimbal; a fixed plate fixed to the gimbal; a first lower support plate extended from a base end of the first lower support plate coupled to the fixed plate toward a top end of the first lower support plate; a second lower support plate extended in parallel with the first lower support plate from a base end of the second lower support plate coupled to the fixed plate toward a top end of the second lower support plate; a first piezoelectric element superposed on a surface of the first lower support plate and joined to the first lower support plate on a first junction area defined on the first lower support plate; a second piezoelectric element superposed on a surface of the second lower support plate and joined to the second lower support plate on a second junction area defined on the second lower support plate; a first upper support plate which is joined to a surface of the first piezoelectric element on a third junction area of the first upper support plate, and interposes the first piezoelectric element between the third junction area and the first junction area, and is configured to generate strain equal to strain of the first lower support plate when a tensile force of the first piezoelectric element acts on the first lower support plate; a second upper support plate which is joined to a surface of the second piezoelectric element on a fourth junction area of the second upper support plate, and interposes the second piezoelectric element between the fourth junction area and the second junction area, and is configured to generate strain equal to strain of the second lower support plate when a tensile force of the second piezoelectric element acts on the second lower support plate; a first junction plate joined to a surface of the first upper support plate on the top end of the first lower support plate; a second junction plate joined to a surface of the second upper support plate on the top end of the second lower support plate; a first coupling piece extended from a base end of the first coupling piece coupled to the first junction plate toward a top end of the first coupling piece; a second coupling piece extended in parallel with the first coupling piece from a base end of the second coupling piece coupled to the second junction plate toward a top end of the second coupling piece; a support plate coupled to the top ends of the first and second coupling pieces; and a head slider fixed to the support plate.

According to still another embodiment of the invention, a storage medium driving device, includes: a flexure having a gimbal; a fixed plate fixed to the gimbal; a first lower support plate extended from a base end of the first lower support plate coupled to the fixed plate toward a top end of the first lower support plate; a second lower support plate extended in parallel with the first lower support plate from a base end of the second lower support plate coupled to the fixed plate toward a top end of the second lower support plate; a first piezoelectric element superposed on a surface of the first lower support plate and joined to the first lower support plate on a first junction area defined on the first lower support plate; a second piezoelectric element superposed on a surface of the second lower support plate and joined to the second lower support plate on a second junction area defined on the second lower support plate; a first upper support plate which is joined to a surface of the first piezoelectric element on a third junction area of the first upper support plate, and interposes the first piezoelectric element between the third junction area and the first junction area, and is configured to generate strain equal to strain of the first lower support plate when a tensile force of the first piezoelectric element acts on the first lower support plate; a second upper support plate which is joined to a surface of the second piezoelectric element on a fourth junction area of the second upper support plate, and interposes the second piezoelectric element between the fourth junction area and the second junction area, and is configured to generate strain equal to strain of the second lower support plate when a tensile force of the second piezoelectric element acts on the second lower support plate; a first junction plate joined to a surface of the first upper support plate on the top end of the first lower support plate; a second junction plate joined to a surface of the second upper support plate on the top end of the second lower support plate; a first coupling piece extended from a base end of the first coupling piece coupled to the first junction plate toward a top end of the first coupling piece; a second coupling piece extended in parallel with the first coupling piece from a base end of the second coupling piece coupled to the second junction plate toward a top end of the second coupling piece; a support plate coupled to the top ends of the first and second coupling pieces; and a head slider which is fixed to the support plate, and faces a storage medium.

An embodiment of the invention will be described with reference to the accompanying drawings.

First, an inside configuration of a storage medium driving device according to the embodiment of the invention will be described. FIG. 1 schematically illustrates the inside configuration of the storage medium driving device according to the embodiment of the invention. A hard disk drive (HDD) is a specific example of the storage device. The HDD 11 includes a housing 12. The housing 12 is composed of a box-shaped base 13 and a cover (not illustrated). The base 13 defines, for example, a flat, rectangular parallelepiped internal space, or storage space. The base 13 may be formed by casting of a metal material such as aluminum. The cover is connected to an opening of the base 13. The storage space between the cover and the base 13 is enclosed. The cover may be formed of one plate material by press working, for example.

In the storage space, at least one magnetic disk 14 is stored as a storage medium. The magnetic disk 14 is mounted on a spindle motor 15. The spindle motor 15 can rotate the magnetic disk 14 at a high speed such as 5,400 rpm, 7,200 rpm, 10,000 rpm, and 15,000 rpm.

In the storage space, a carriage 16 is also stored. The carriage 16 includes a carriage block 17. The carriage block 17 is rotatably connected to a support shaft 18 extending in the vertical direction. In the carriage block 17, a plurality of carriage arms 19 are arranged extending horizontally from the support shaft 18. The carriage block 17 may be formed of aluminum by extrusion molding, for example.

A head suspension assembly 21 is attached to a top end of each carriage arm 19. The head suspension assembly 21 includes a head suspension 22 extending forward from the top end of the carriage arm 19. A flexure is attached to the head suspension 22. As described later, a gimbal is arranged on the flexure at the top end of the head suspension 22. A flying head slider 23 is mounted on the gimbal. A posture of the flying head slider 23 can be changed with respect to the head suspension 22 by an action of the gimbal. A magnetic head, or an electromagnetic conversion element, is mounted on the flying head slider 23. The head suspension 22 produces pressing force to bring the flying head slider 23 closer to a surface of the magnetic disk 14.

When air flow is generated on a surface of the magnetic disk 14 by rotation of the magnetic disk 14, a positive pressure, or a buoyant force, and a negative pressure are applied to the flying head slider 23 by an action of the air flow. The buoyant force and the negative pressure are balanced with the pressing force of the head suspension 22. Thus, the flying head slider 23 can be flying with relatively high rigidity during rotation of the magnetic disk 14.

A power source such as a voice coil motor (VCM) 24 is connected to the carriage block 17. The carriage block 17 can be rotated around the support shaft 18 by the VCM 24. Swing motions of the carriage arm 19 and the head suspension 22 are realized based on the rotation of the carriage block 17. When the carriage arm 19 swings around the support shaft 18 while the flying head slider 23 is flying, the flying head slider 23 can traverse the surface of the magnetic disk 14 in a radial direction. Based on such movement of the flying head slider 23, the electromagnetic conversion element may be positioned with respect to a target recording track.

A long member extending forward from the top end of the head suspension 22, or, a load tab 25, is arranged at the top end of the head suspension 22. The load tab 25 may move in the radial direction of the magnetic disk 14 by the swing of the carriage arm 19. A ramp member 26 is arranged outside of the magnetic disk 14 on a movement path of the load tab 25. The load tab 25 is received by the ramp member 26. The ramp member 26 and the load tab 25 cooperate with each other to compose a so-called load/unload mechanism. The ramp member 26 may be formed of a hard plastic material, for example.

Figure 2:
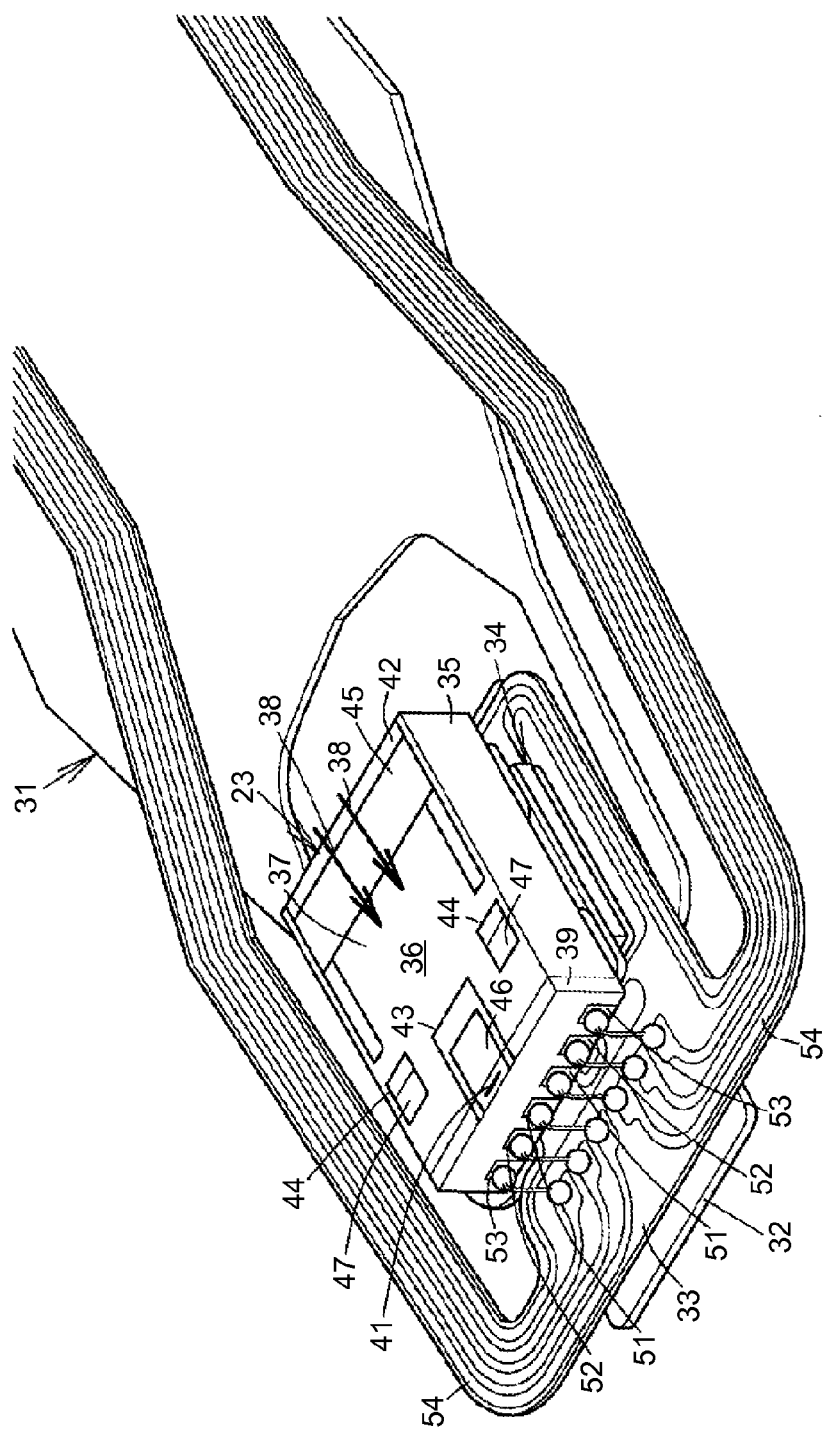
FIG. 2 is an exemplary partially enlarged perspective view of a head suspension assembly in the embodiment.

As illustrated in FIG. 2, a gimbal 32 is arranged on a top end of a flexure 31 in the head suspension assembly 21. The gimbal 32 may be obtained by punching a thin plate material of stainless steel, for example. A flexible printed circuit board 33 is superposed on a surface of the gimbal 32. The flexible printed circuit board 33 is bonded to the surface of the gimbal 32, for example. A micro actuator device 34 according to one embodiment of the invention is arranged on a position apart from the flexible printed circuit board 33 on the surface of the gimbal 32. The flying head slider 23 is arranged on the micro actuator device 34. A flying posture of the flying head slider 23 can be changed with respect to the surface of the magnetic disk 14 by an action of the gimbal 32.

The flying head slider 23 includes a slider main body 35 that is, for example, a base material formed as a flat rectangular parallelepiped. The slider main body 35 may be made of a hard non-magnetic material such as $Al_2O_3$—TiC (ALTiC). A medium facing surface, which is a flying surface 36, of the slider main body 35 faces the magnetic disk 14. A reference surface 37, which is a flat base surface, is provided on the flying surface 36. When the magnetic disk 14 rotates, an air flow 38 from a front end to a rear end of the slider main body 35 is applied to the flying surface 36.

An element-containing film 39, which is an insulating non-magnetic film, is provided on an air outflow edge surface of the slider main body 35. An electromagnetic conversion element 41 is embedded in the element-containing film 39. The element-containing film 39 may be made of a relatively soft insulating non-magnetic material such as $Al_2O_3$ (alumina).

A front rail 42 rising from the base surface 37 on an upstream side of the air flow 38, which is an air inflow side, is formed on the flying surface 36. The front rail 42 extends along an air inflow edge of the base surface 37 in a slider width direction. In a similar way, a rear center rail 43 rising from the base surface 37 on a downstream side of the air flow 38, which is an air outflow side, is formed on the flying surface 36. The rear center rail 43 is arranged at a center position in the slider width direction. The rear center rail 43 reaches the element-containing film 39. A left-right pair of rear side rails 44, 44 are further formed on the flying surface 37. The rear side rail 44, 44 rise from the base surface 37 on the air outflow side along side edges of the slider main body 35, respectively. The rear center rail 43 is arranged between the two rear side rails 44, 44.

So-called air bearing surfaces (ABS) 45, 46, 47, 48 are arranged on the top surfaces of the front rail 42, the rear center rail 43, and the rear side rails 44, 44. Level differences are respectively arranged on top surfaces of the front rail 42, the rear center rail 43, and the rear side rails 44 on the air inflow edges of the air bearing surfaces 45, 46, 47. When the air flow 38 is received by the flying surface 37, a relatively large positive pressure that is a buoyant force is generated on the air bearing surfaces 45, 46, 47 by actions of the level differences. In addition, a large negative force is generated at a rear or back of the front rail 42. Based on a balance of the buoyant force and the negative force, a flying posture of the flying head slider 23 is determined.

The electromagnetic conversion element 41 is embedded in the rear center rail 43 on the air outflow side of the air bearing surface 46. The electromagnetic conversion element 41 includes, for example, the read element and the write element. A so-called thin-film magnetic head is used as the write element. The thin-film magnetic head generates a magnetic field with a thin-film coil pattern thereof. Using the magnetic field, information is written into the magnetic disk 14. On the other hand, a giant magnetoresistance effect (GMR) element and a tunnel junction magnetoresistance effect (TMR) element are used as the read element. In the GMR element and the TMR element, changes of resistances of a spin-valve film and a tunnel junction film occur according to a direction of the magnetic field acting from the magnetic disk 14. Based on such changes of resistances, the information is read from the magnetic disk 14. The electromagnetic conversion element 41 has a read gap of the read element and a write gap of the write element which face a surface of the element-containing film 39. However, a hard protective film may be formed on the surface of the element-containing film 39 on the air outflow side of the air bearing surface 46. The hard protective film covers a top end of the read gap and a top end of the write gap which the surface of the element-containing film 39 has. For example, a diamond like carbon (DLC) film may be used as the hard protective film.

Three pairs of electrode terminals 51, 52 and 53 are arranged on an air outflow edge surface of the flying head slider 23, or on the surface of the element-containing film 39. The pair of electrode terminals 51 are electrically connected to the write element of the electromagnetic conversion element 41, for example. A writing current is supplied from the electrode terminals 51 to the write element. The thin-film coil pattern generates the magnetic field, for example, according to supply of the writing current. The pair of electrode terminals 52 are electrically connected to the read element of the electromagnetic conversion element 41, for example. A sense current is supplied from the electrode terminals 52 to the read element. Change of voltage of the sense current is detected from the electrode terminals 52. The pair of electrode terminals 53 are connected to a thermal actuator. The thermal actuator includes a heating wire pattern embedded in the electromagnetic conversion element 41, for example. The heating wire pattern may be arranged between the write element and the read element, for example. When electric power is supplied to the heating wire pattern, the heating wire pattern generates heat. The write element thermally expands, for example, according to the heat generation. Thus, the element-containing film 39 moves toward the magnetic disk 14 at the top end of the write gap. While the flying head slider 23 is flying, the top end of the write gap may move closer to the magnetic disk 14 according to the heating value of the heating wire pattern. The electrode terminals 51, 52 and 53 are individually connected to a wiring pattern 54 on the flexible printed circuit board 33. As the connecting method, wire bonding is used, for example.

Figure 3:
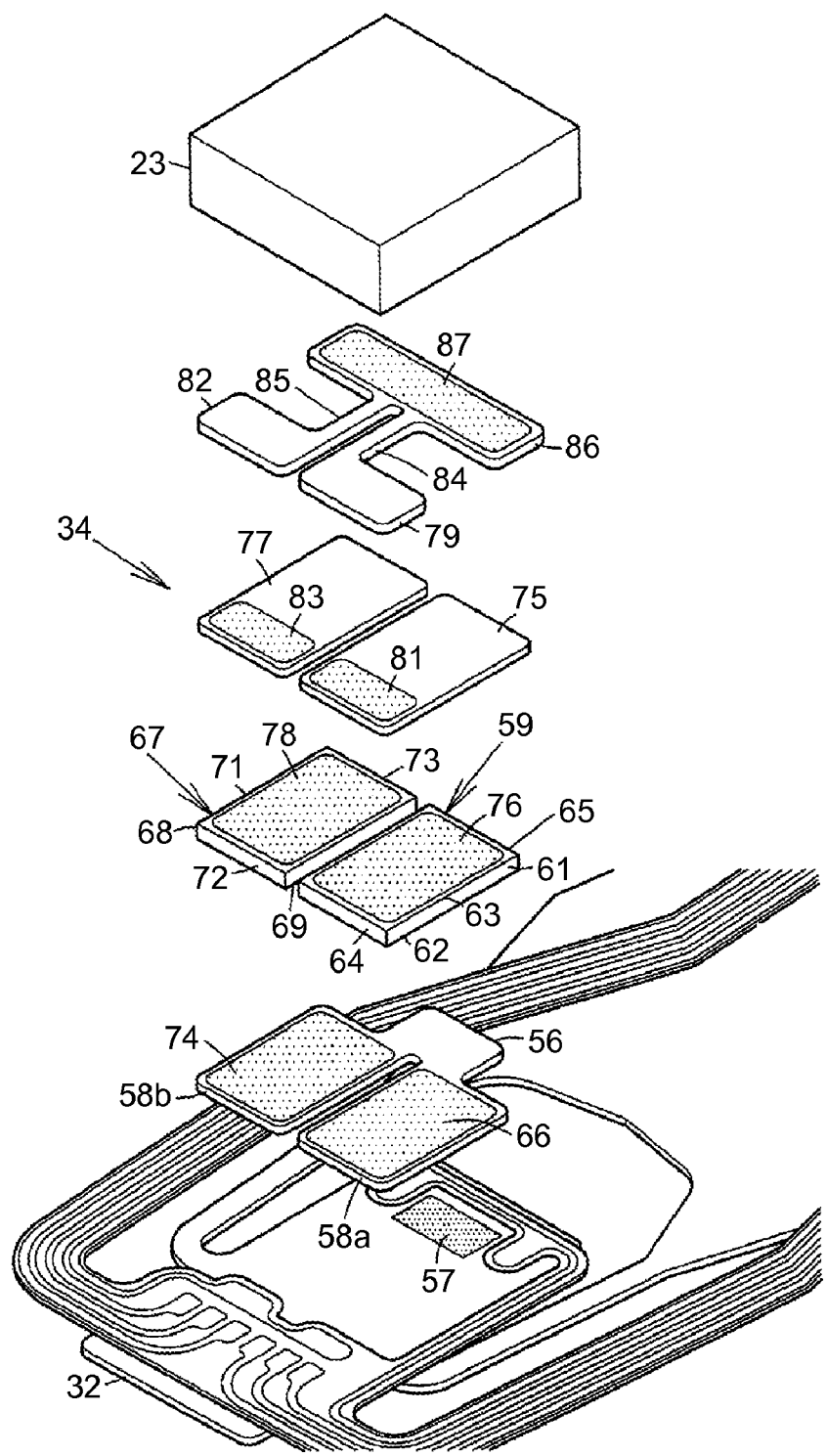
FIG. 3 is an exemplary schematic enlarged broken perspective view of a micro actuator device in the embodiment.

As illustrated in FIG. 3, the micro actuator device 34 includes a fixed plate 56 fixed to the surface of the gimbal 32. An entire rear surface of the fixed plate 56 is bonded to the surface of the gimbal 32, for example. A bonding layer 57 is established between the fixed plate 56 and the gimbal 32. It is desirable that the bonding layer 57 has relatively high rigidity. An epoxy adhesive may be used as the bonding layer 57, for example.

First and second lower support plates 58a and 58b are coupled to the fixed plate 56. The first lower support plate 58a is extended from a base end of the first lower support plate 58a coupled to the fixed plate 56 toward a top end of the first lower support plate 58a. Similarly, the second lower support plate 58b is extended from a base end of the second lower support plate 58b coupled to the fixed plate 56 toward a top end of the lower support plate 58b. The second lower support plate 58b is extended in parallel with the first lower support plate 58a. The first and second lower support plates 58a and 58b are not bonded to the gimbal 32. The first and second lower support plates 58a and 58b may move relative to the gimbal 32. The fixed plate 56 and the first and second lower support plates 58a and 58b may be obtained by punching one stainless steel thin plate, for example.

A first piezoelectric element 59 is superposed on a surface of the first lower support plate 58a. The first piezoelectric element 59 includes a first thin plate 61 made of piezoelectric ceramic. The first thin plate 61 is composed of a piezoelectric material such as PNN-PT-PZ. A first electrode layer 62 is formed on a rear surface of the first thin plate 61. The first electrode layer 62 covers the rear surface of the first thin plate 61. Similarly, a second electrode layer 63 is formed on a front surface of the first thin plate 61. The second electrode layer 63 covers the front surface of the first thin plate 61. At the top end of the first lower support plate 58a, a first edge surface of the first thin plate 61 is covered with a first extraction electrode 64. Similarly, at the base end of the first lower support plate 58a, a second edge surface of the first thin plate 61 is covered with a second extraction electrode 65. The first electrode layer 62 is connected to the first extraction electrode 64. Between the first electrode layer 62 and the second extraction electrode 65, a clearance is secured along a ridge between the second edge surface and the rear surface of the first thin plate 61. The first electrode layer 62 is not electrically connected to the second extraction electrode 65. Similarly, the second electrode layer 63 is connected to the second extraction electrode 65. Between the second electrode layer 63 and the first extraction electrode 64, a clearance is secured along a ridge between the first edge surface and the rear surface of the first thin plate 61. The second electrode layer 63 is not electrically connected to the first extraction electrode 64. In each of the above mentioned cases, the clearance is minimal. It is only necessary to electrically insulate the electrode layer and the extraction electrode. The first electrode layer 62 completely covers all of the rear surface of the first thin plate 61 except the clearance. The second electrode layer 63 covers all of the front surface of the first thin plate 61 except the clearance. An entire surface of the first electrode layer 62 is bonded to the first lower support plate 58a. A first bonding layer 66 is established between the first electrode layer 62 and the first lower support plate 58a. A first junction area is defined in the first lower support plate 58a with an outline of the first bonding layer 66. It is desirable that the first bonding layer 66 has relatively high rigidity. The epoxy adhesive may be used as the first bonding layer 66, for example.

Similarly, a second piezoelectric element 67 is superposed on a surface of the second lower support plate 58b. The second piezoelectric element 67 includes a second thin plate 68 made of piezoelectric ceramic as in the case of the above-mentioned. A third electrode layer 69 is formed on a rear surface of the second thin plate 68. The third electrode layer 69 covers the rear surface of the second thin plate 68. Similarly, a fourth electrode layer 71 is formed on a front surface of the second thin plate 68. The fourth electrode layer 71 covers the front surface of the second thin plate 68. A first edge surface of the second thin plate 68 is covered with a third extraction electrode 72 at the top end of the second lower support plate 58b. Similarly, a second edge surface of the second thin plate 68 is covered with a fourth extraction electrode 73 at the base end of the second lower support plate 58b. The third electrode layer 69 is connected to the third extraction electrode 72. Between the third electrode layer 69 and the fourth extraction electrode 73, a clearance is secured along a ridge between the second edge surface and the rear surface of the second thin plate 68. The third electrode layer 69 is not electrically connected to the fourth extraction electrode 73. Similarly, the fourth electrode layer 71 is connected to the fourth extraction electrode 73. Between the fourth electrode layer 71 and the third extraction electrode 72, a clearance is secured along a ridge between the first edge surface and the rear surface of the second thin plate 68. The fourth electrode layer 71 is not electrically connected to the third extraction electrode 72. In each of the above mentioned cases, the clearance is minimal. The third electrode layer 69 completely covers all of the rear surface of the second thin plate 68 except the clearance. The fourth electrode layer 71 covers all of the front surface of the second thin plate 68 except the clearance. An entire surface of the third electrode layer 69 is bonded to the second lower support plate 58b. A second bonding layer 74 is established between the third electrode layer 69 and the second lower support plate 58b. A second junction area is defined in the second lower support plate 58b with an outline of the second bonding layer 74. It is desirable that the second bonding layer 74 has relatively high rigidity. The epoxy adhesive may be used as the second bonding layer 74, for example. Rigidity of each of the electrode layers 69 and 71 is reinforced by the second bonding layer 74.

A first upper support plate 75 is superposed on the first piezoelectric element 59. The first upper support plate 75 is bonded to an entire surface of the second electrode layer 63 of the first piezoelectric element 59. A bonding layer 76 is established between the first upper support plate 75 and the second electrode layer 63. A third junction area is defined in the first upper support plate 75 with an outline of the bonding layer 76. The first piezoelectric element 59 is interposed between the first junction area and the third junction area. Similarly, a second upper support plate 77 is superposed on the second piezoelectric element 67. The second upper support plate 77 is bonded to an entire surface of the fourth electrode layer 71 of the second piezoelectric element 67. A bonding layer 78 is established between the second upper support plate 77 and the fourth electrode layer 71. A fourth junction area is defined in the second upper support plate 77 with an outline of the bonding layer 78. The second piezoelectric element 67 is interposed between the second junction area and the fourth junction area. The first and second upper support plates 75 and 77 may be formed of the metal thin plate such as stainless steel. It is desirable that the bonding layers 76 and 78 have relatively high rigidity. The epoxy adhesive may be used as the bonding layers 76 and 78, for example.

A first junction plate 79 is superposed on a surface of the first upper support plate 75 at the top end of the first lower support plate 58a. An entire surface of the first junction plate 79 is joined to a surface of the first upper support plate 75. In order to join the first junction plate 79 and the first upper support plate 75, a bonding layer 81 is established between the first junction plate 79 and the first upper support plate 75. Similarly, a second junction plate 82 is superposed on a surface of the second upper support plate 77 on the top end of the second lower support plate 58b. An entire surface of the second junction plate 82 is joined to a surface of the second upper support plate 77. In order to join the second junction plate 82 and the second upper support plate 77, a bonding layer 83 is established between the second junction plate 82 and the second upper support plate 77. It is desirable that the bonding layers 81 and 83 have relatively high rigidity. The epoxy adhesive may be used as the bonding layers 81 and 83, for example.

An elongated first coupling piece 84 is coupled to the first junction plate 79. The first coupling piece 84 is extended from a base end of the first coupling piece coupled to the first junction plate 79 toward a top end of the first coupling piece. That is to say, the first coupling piece 84 is extended from the top end of the first lower support plate 58a toward the base end of the first lower support plate 58a. The first coupling piece 84 and the first upper support plate 75 are not bonded to each other. The first coupling piece 84 may move relative to the first upper support plate 75. Similarly, an elongated second coupling piece 85 is coupled to the second junction plate 82. The second coupling piece 85 is extended from a base end of the second coupling piece 85 coupled to the second junction plate 82 toward a top end of the second coupling piece 85. That is to say, the second coupling piece 85 is extended from the top end of the second lower support plate 58b toward the base end of the second lower support plate 58b. The second coupling piece 85 and the second upper support plate 77 are not bonded to each other. The second coupling piece 85 may move relative to the second upper support plate 77.

A support plate 86 is coupled to the top ends of the first and second coupling pieces 84 and 85. The support plate 86 may be arranged above the fixed plate 56, for example. The support plate 86 and the first and second upper support plates 75 and 77 are not bonded to each other. The support plate 86 may move relative to the first and second upper support plates 75 and 77. The flying head slider 23 is superposed on a surface of the support plate 86. The flying head slider 23 is fixed to the support plate 86. In order to fix the support plate 86 to the flying head slider 23, a bonding layer 87 is established between the support plate 86 and the flying head slider 23. The bonding layer 87 is spread on an entire surface of the support plate 86. The first and second junction plates 79 and 82, the first and second coupling pieces 84 and 85 and the support plate 86 cooperate with one another to compose a so-called hinge plate. Such hinge plate may be obtained by punching one stainless steel thin plate, for example. It is desirable that the bonding layer 87 has relatively high rigidity. The epoxy adhesive may be used as the bonding layer 87, for example.

Figure 4:
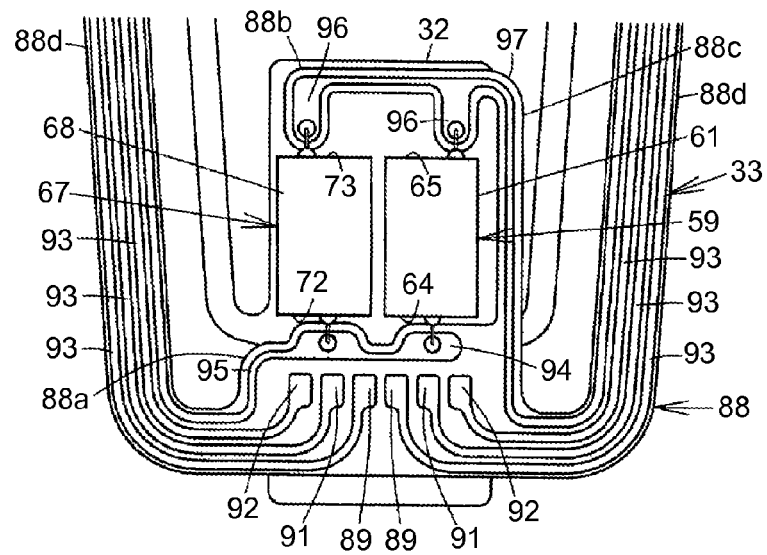
FIG. 4 is an exemplary enlarged plan view of a flexible printed circuit board in the embodiment.

As illustrated in FIG. 4, the flexible printed circuit board 33 includes a thin film 88 made of resin. On the thin film 88, a first bonding piece 88a bonded to the gimbal 32 on a front side of the above-mentioned first and second piezoelectric elements 59 and 67, or on the outflow side of the airflow 38, and a second bonding piece 88b bonded to the gimbal 32 on a back side of the first and second piezoelectric elements 59 and 67, or the inflow side of the airflow 38 are arranged. The first bonding piece 88a and the second bonding piece 88b are connected to each other with a long connection piece 88c. A pair of long pieces 88d and 88d are connected to the first bonding piece 88a. The long piece 88d is extended toward the carriage arm 19 while going around the micro actuator device 34 and the flying head slider 23. The long pieces 88d are arranged on a surface of the head suspension 22.

Three pairs of conductive pads 89, 91 and 92 are formed on a surface of the first bonding piece 88a. The pair of conductive pads 89 are individually connected to the electrode terminals 51 and 51 (See FIG. 2). The pair of conductive pads 91 are individually connected to the electrode terminals 52 and 52. The pair of conductive pads 92 are individually connected to the electrode terminals 53 and 53. A wiring pattern 93 is separately connected to each of the conductive pads 89, 91 and 92. The wiring pattern 93 is extended along a surface of the long piece 88d.

A first electrode pad 94 is formed on the surface of the first bonding piece 88a. The respective first extraction electrodes 64 and 72 of the first and second piezoelectric elements 59 and 67 are connected to the first electrode pad 94. As the connecting method, the wire bonding may be used, for example. A wiring pattern 95 is connected to the first electrode pad 94. The wiring pattern 95 is extended along the surface of one of the long pieces 88d.

A second electrode pad 96 is formed on a surface of the second bonding piece 88b. The first and second piezoelectric elements 59 and 67 are arranged between the first electrode pad 94 and the second electrode pad 96. The respective second extraction electrodes 65 and 73 of the first and second piezoelectric elements 59 and 67 are connected to the second electrode pad 96. As the connecting method, the wire bonding may be used, for example. A wiring pattern 97 is connected to the second electrode pad 96. The wiring pattern 97 is guided along the connection piece 88c to the first bonding piece 88a. The wiring pattern 97 is extended along the surface of the other of the elongated pieces 88d. In this manner, the wiring patterns 93, 95 and 97 are equally allocated to each of the long pieces 88d and 88d.

Figure 5:
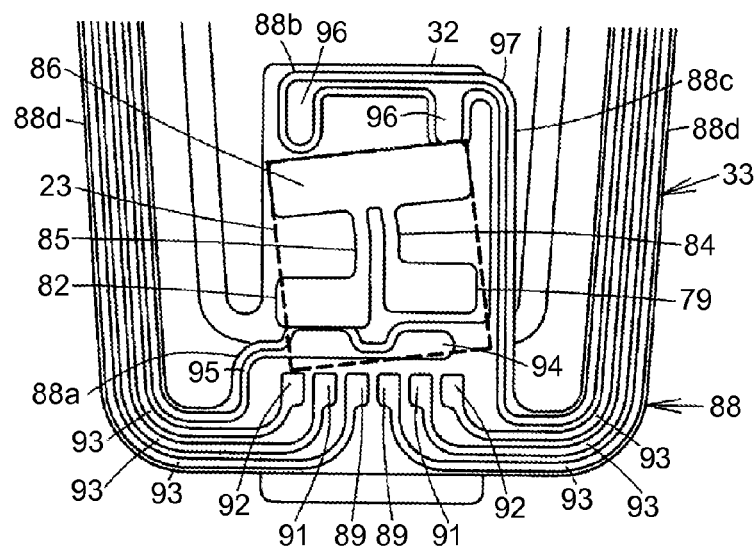
FIG. 5 is an exemplary partially enlarged plan view of the head suspension assembly in the embodiment.

The first thin plate 61 of the first piezoelectric element 59 is polarized from the first electrode layer 62 to the second electrode layer 63. On the other hand, the second thin plate 68 of the second piezoelectric element 67 is polarized from the fourth electrode layer 71 to the third electrode layer 69. Therefore, when a voltage is applied from the first electrode pad 94 to the second electrode pad 96, in the first piezoelectric element 59, the first electrode layer 62 and the second electrode layer 63 move away from each other based on a piezoelectric effect of the first thin plate 61. The first piezoelectric element 59 contracts along the first and second electrode layers 62 and 63. As a result, as illustrated in FIG. 5, the first junction plate 79 is displaced toward the fixed plate 56. The displacement of the first junction plate 79 is transmitted through the first coupling piece 84 to the support plate 86. The first coupling piece 84 provides a driving force to move the support plate 86 toward the inflow side of the airflow 38. At that time, in the second piezoelectric element 67, the third electrode layer 69 and the fourth electrode layer 71 move closer to each other based on a piezoelectric effect of the second thin plate 68. The second piezoelectric element 67 extends along the first and second electrode layers 69 and 71. As a result, as illustrated in FIG. 5, the second junction plate 82 moves away from the fixed plate 56. The displacement of the second junction plate 82 is transmitted through the second coupling piece 85 to the support plate 86. The second coupling piece 85 provides a driving force to move the support plate 86 toward the outflow side of the airflow 38. In this manner, the flying head slider 23 rotates around a rotational shaft orthogonal to the gimbal 32. A displacement of the electromagnetic conversion element 41 is obtained in a width direction of the recording track. On the contrary, when a voltage is applied from the second electrode pad 96 to the first electrode pad 94, the flying head slider 23 rotates in the opposite direction around the rotational shaft.

In the micro actuator device 34, the first piezoelectric element 59 is interposed between the first lower support plate 58a and the first upper support plate 75. A strength of the first piezoelectric element 59 is reinforced. A fragility of the first piezoelectric element 59 is supported. Similarly, the second piezoelectric element 67 is interposed between the second lower support plate 58b and the second upper support plate 77. A strength of the second piezoelectric element 67 is reinforced. A fragility of the second piezoelectric element 67 is supported.

Figure 6:
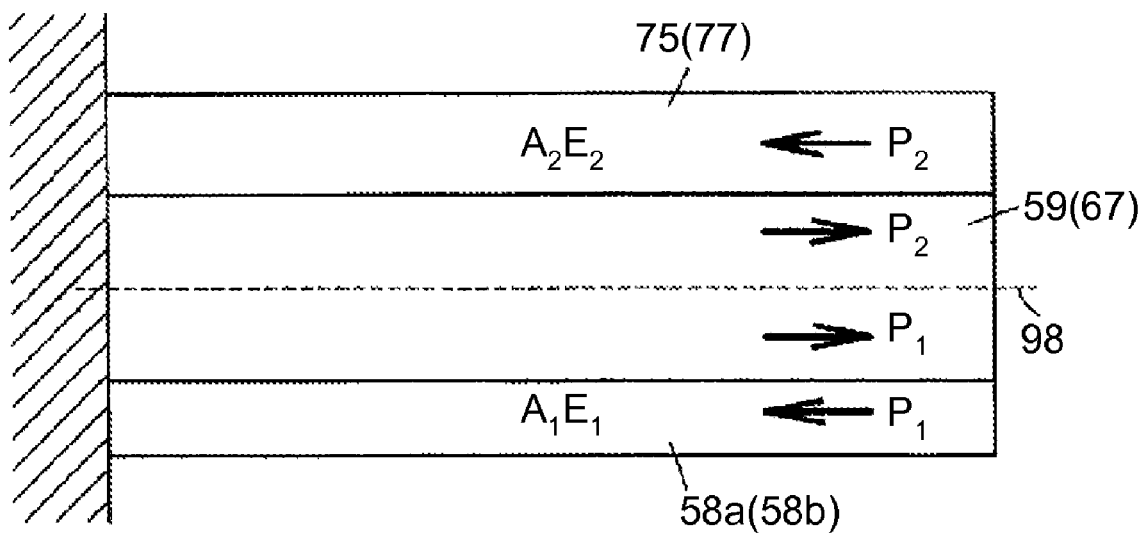
FIG. 6 is an exemplary vertical sectional view of a lower support plate, a piezoelectric element and an upper support plate in the embodiment.

In the above-mentioned micro actuator device 34, as illustrated in FIG. 6, for example, when the first piezoelectric element 59 is deformed, a tensile force (or compression force) of the first piezoelectric element 59 acts on the first lower support plate 58a. A product $A_1E_1$ of an area $A_1$ of a cross section orthogonal to a direction of the tensile force in the first lower support plate 58a and a longitudinal elastic modulus $E_1$ of the first lower support plate 58a is set to be equal to a product $A_2E_2$ of an area $A_2$ of a cross section orthogonal to the direction of the tensile force in the first upper support plate 75 and a longitudinal elastic modulus $E_2$ of the first upper support plate 75. As a result, the first piezoelectric element 59 is free from bending deformation. Similarly, a product $A_1E_1$ of an area $A_1$ of a cross section orthogonal to the direction of the tensile force in the second lower support plate 58b and a longitudinal elastic modulus $E_1$ of the second lower support plate 58b is set to be equal to a product $A_2E_2$ of an area $A_2$ of a cross section orthogonal to the direction of the tensile force in the second upper support plate 77 and a longitudinal elastic modulus $E_2$ of the second upper support plate 77. As a result, the second piezoelectric element 67 is free from bending deformation. In order to realize such product $A_1E_1$, in the micro actuator device 34, the first lower support plate 58a, the first piezoelectric element 59 and the first upper support plate 75 are formed so as to be symmetric about a neutral surface 98 of the first piezoelectric element 59. Similarly, the second lower support plate 58b, the second piezoelectric element 67 and the second upper support plate 77 are formed so as to be symmetric about the neutral surface 98 of the second piezoelectric element 67.

When the first piezoelectric element 59 contracts, for example, a first shear stress $P_1$ is generated along a boundary between the first piezoelectric element 59 and the first lower support plate 58a. Similarly, a second shear stress $P_2$ is generated along a boundary between the first piezoelectric element 59 and the first upper support plate 75. First strain $\epsilon_1$ is generated on the boundary based on the first shear stress $P_1$. Second strain $\epsilon_2$ is generated on the boundary based on the second shear stress $P_2$. The first strain $\epsilon_1$ and the second strain $\epsilon_2$ are defined as follows.

$$\varepsilon_1 = -\frac{P_1}{A_1 E_1}$$

$$\varepsilon_2 = -\frac{P_2}{A_2 E_2}$$

Here, when $P_1=P_2$ and $\epsilon_1=\epsilon_2$ are satisfied, the bending deformation in the first piezoelectric element 59 may be avoided. Therefore, $$A_1E_1=A_2E_2$$

is derived. Furthermore, since each of a junction surface of the first piezoelectric element 59 and the first lower support plate 58a and a junction surface of the first piezoelectric element 59 and the first upper support plate 75 has a width dimension of the first piezoelectric element 59, when a product $t_1E_1$ of a plate thickness $t_1$ of the first lower support plate 58a and the longitudinal elastic modulus $E_1$ of the first lower support plate is set to be equal to a product $t_2E_2$ of a plate thickness $t_2$ of the first upper support plate 75 and the longitudinal elastic modulus $E_2$ of the first upper support plate 75, the bending deformation in the first piezoelectric element 59 may be avoided. Similarly, when a product $t_1E_1$ of a plate thickness $t_1$ of the second lower support plate 58b and the longitudinal elastic modulus $E_1$ of the second lower support plate 58b is set to be equal to a product $t_2E_2$ of a plate thickness $t_2$ of the second upper support plate 77 and the longitudinal elastic modulus $E_2$ of the second upper support plate 77, the bending deformation in the second piezoelectric element 67 may be avoided.

In such micro actuator device, the first junction plate is relatively displaced with respect to the fixed plate according to expansion and contraction of the first piezoelectric element. The displacement of the first junction plate is transmitted through the first coupling piece to the support plate. The first coupling piece provides a driving force to the support plate. Similarly, the second junction plate is relatively displaced with respect to the fixed plate according to expansion and contraction of the second piezoelectric element. The displacement of the second junction plate is transmitted through the second coupling piece to the support plate. The second coupling piece provides a driving force to the support plate. In this manner, the support plate is relatively displaced with respect to the fixed plate. For example, the support plate may swing around a rotational shaft orthogonal to one plane including a surface of the fixed plate.

In the micro actuator device, the first piezoelectric element is interposed between the first lower support plate and the first upper support plate. A strength of the first piezoelectric element is reinforced. A fragility of the first piezoelectric element is supported. Similarly, the second piezoelectric element is interposed between the second lower support plate and the second upper support plate. A strength of the second piezoelectric element is reinforced. A fragility of the second piezoelectric element is supported. Furthermore, the first upper support plate generates strain equal to strain of the first lower support plate when a tensile force the first piezoelectric element acts on the first lower support plate. The first piezoelectric element is free from bending deformation. Similarly, the second upper support plate generates strain equal to strain of the second lower support plate when a tensile force the second piezoelectric element acts on the second lower support plate. The second piezoelectric element is free from bending deformation. Vibrations of the torsional mode and the bending mode may be surely reduced according to the expansion and contraction of the first and second piezoelectric elements. A wide limited band of the micro actuator device may be secured.

In such micro actuator device, a product of an area of a cross section orthogonal to a direction of the tensile force in the first lower support plate and a longitudinal elastic modulus of the first lower support plate is set to be equal to a product of an area of a cross section orthogonal to the direction of the tensile force in the first upper support plate and a longitudinal elastic modulus of the first upper support plate. As a result, the first upper support plate generates the strain equal to the strain of the first lower support plate when the tensile force of the first piezoelectric element acts on the first lower support plate. The first lower support plate, the first piezoelectric element and the first upper support plate are formed so as to be symmetric about a neutral surface of the first piezoelectric element.

Similarly, a product of an area of a cross section orthogonal to the direction of the tensile force in the second lower support plate and a longitudinal elastic modulus of the second lower support plate is set to be equal to a product of an area of a cross section orthogonal to the direction of the tensile force in the second upper support plate and a longitudinal elastic modulus of the second upper support plate. As a result, the second upper support plate generates the strain equal to the strain of the second lower support plate when the tensile force of the second piezoelectric element acts on the second lower support plate. The second lower support plate, the second piezoelectric element and the second upper support plate are formed so as to be symmetric about on a neutral surface of the first piezoelectric element.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A micro actuator device, comprising:
an attachment plate attached to a supporter;
a first lower support plate extended from a base end of the first lower support plate coupled to the attachment plate toward a top end of the first lower support plate;
a second lower support plate extended in parallel with the first lower support plate from a base end of the second lower support plate coupled to the attachment plate toward a top end of the second lower support plate;
a first piezoelectric element on a surface of the first lower support plate and attached to the first lower support plate on a first junction area on the first lower support plate;
a second piezoelectric element on a surface of the second lower support plate and attached to the second lower support plate on a second junction area on the second lower support plate;
a first upper support plate attached to a surface of the first piezoelectric element on a third junction area of the first upper support plate, comprising the first piezoelectric element between the third junction area and the first junction area, and configured to generate a strain substantially equal to a strain of the first lower support plate when a tensile force of the first piezoelectric element is applied to the first lower support plate;
a second upper support plate attached to a surface of the second piezoelectric element on a fourth junction area of the second upper support plate, comprising the second piezoelectric element between the fourth junction area and the second junction area, and configured to generate a strain substantially equal to a strain of the second lower support plate when a tensile force of the second piezoelectric element is applied to the second lower support plate;
a first junction plate attached to a surface of the first upper support plate on the top end of the first lower support plate;
a second junction plate attached to a surface of the second upper support plate on the top end of the second lower support plate;
a first coupling portion extending from a base end of the first coupling portion coupled to the first junction plate toward a top end of the first coupling portion;
a second coupling portion in parallel with the first coupling portion from a base end of the second coupling portion coupled to the second junction plate toward a top end of the second coupling portion; and
a support plate coupled to the top ends of the first and second coupling portions.

2. The micro actuator device of claim 1, wherein a product of an area of a cross section orthogonal to a direction of the tensile force in the first lower support plate and a longitudinal elastic modulus of the first lower support plate is substantially equal to a product of an area of a cross section orthogonal to the direction of the tensile force in the first upper support plate and a longitudinal elastic modulus of the first upper support plate.

3. The micro actuator device of claim 2, wherein a product of an area of a cross section orthogonal to a direction of the tensile force in the second lower support plate and a longitudinal elastic modulus of the second lower support plate is substantially equal to a product of an area of a cross section orthogonal to the direction of the tensile force in the second upper support plate and a longitudinal elastic modulus of the second upper support plate.

4. The micro actuator device of claim 1, wherein the first lower support plate and the first upper support plate are symmetrical with respect to a neutral surface of the first piezoelectric element.

5. The micro actuator device of claim 4, wherein the second lower support plate and the second upper support plate are symmetrical with respect to a neutral surface of the second piezoelectric element.

6. A head suspension assembly, comprising:
a flexure comprising a gimbal;
an attachment plate attached to the gimbal;
a first lower support plate extended from a base end of the first lower support plate coupled to the attachment plate toward a top end of the first lower support plate;
a second lower support plate extended in parallel with the first lower support plate from a base end of the second lower support plate coupled to the attachment plate toward a top end of the second lower support plate;
a first piezoelectric element on a surface of the first lower support plate and attached to the first lower support plate on a first junction area on the first lower support plate;
a second piezoelectric element on a surface of the second lower support plate and attached to the second lower support plate on a second junction area on the second lower support plate;
a first upper support plate attached to a surface of the first piezoelectric element on a third junction area of the first upper support plate, comprising the first piezoelectric element between the third junction area and the first junction area, and configured to generate a strain substantially equal to a strain of the first lower support plate when a tensile force of the first piezoelectric element is applied to the first lower support plate;
a second upper support plate attached to a surface of the second piezoelectric element on a fourth junction area of the second upper support plate, comprising the second piezoelectric element between the fourth junction area and the second junction area, and configured to generate a strain substantially equal to a strain of the second lower support plate when a tensile force of the second piezoelectric element is applied to the second lower support plate;
a first junction plate attached to a surface of the first upper support plate on the top end of the first lower support plate;
a second junction plate attached to a surface of the second upper support plate on the top end of the second lower support plate;
a first coupling portion extending from a base end of the first coupling portion coupled to the first junction plate toward a top end of the first coupling portion;
a second coupling portion in parallel with the first coupling portion from a base end of the second coupling portion coupled to the second junction plate toward a top end of the second coupling portion;

a support plate coupled to the top ends of the first and second coupling portions; and a head slider attached to the support plate.

7. A storage medium driving device, comprising:

a flexure comprising a gimbal;

an attachment plate attached to the gimbal;

a first lower support plate extended from a base end of the first lower support plate coupled to the attachment plate toward a top end of the first lower support plate;

a second lower support plate extended in parallel with the first lower support plate from a base end of the second lower support plate coupled to the attachment plate toward a top end of the second lower support plate;

a first piezoelectric element on a surface of the first lower support plate and attached to the first lower support plate on a first junction area on the first lower support plate;

a second piezoelectric element on a surface of the second lower support plate and attached to the second lower support plate on a second junction area on the second lower support plate;

a first upper support plate attached to a surface of the first piezoelectric element on a third junction area of the first upper support plate, comprising the first piezoelectric element between the third junction area and the first junction area, and configured to generate a strain substantially equal to a strain of the first lower support plate when a tensile force of the first piezoelectric element is applied to the first lower support plate;

a second upper support plate attached to a surface of the second piezoelectric element on a fourth junction area of the second upper support plate, comprising the second piezoelectric element between the fourth junction area and the second junction area, and configured to generate a strain substantially equal to a strain of the second lower support plate when a tensile force of the second piezoelectric element is applied to the second lower support plate;

a first junction plate attached to a surface of the first upper support plate on the top end of the first lower support plate;

a second junction plate attached to a surface of the second upper support plate on the top end of the second lower support plate;

a first coupling portion extending from a base end of the first coupling portion coupled to the first junction plate toward a top end of the first coupling portion;

a second coupling portion in parallel with the first coupling portion from a base end of the second coupling portion coupled to the second junction plate toward a top end of the second coupling portion;

a support plate coupled to the top ends of the first and second coupling portions; and a head slider attached to the support plate, and facing a storage medium.

* * * * *